United States Patent [19]

Bosenberg

[11] Patent Number: 5,047,668
[45] Date of Patent: Sep. 10, 1991

[54] OPTICAL WALKOFF COMPENSATION IN CRITICALLY PHASE-MATCHED THREE-WAVE FREQUENCY CONVERSION SYSTEMS

[75] Inventor: Walter R. Bosenberg, Monmouth Junction, N.J.

[73] Assignee: Cornell Research Foundation, Inc., Ithaca, N.Y.

[21] Appl. No.: 543,419

[22] Filed: Jun. 26, 1990

[51] Int. Cl.[5] .............................................. H03F 7/00
[52] U.S. Cl. .................................... 359/330; 372/20; 372/21
[58] Field of Search .................. 307/425, 428; 372/20, 372/21, 22, 98, 105

[56] References Cited

U.S. PATENT DOCUMENTS 4,639,923 1/1987 Tang et al. .......................... 307/428

OTHER PUBLICATIONS

"Recent Developments in Barium Borate", Fan et al., SPIE, vol. 681, Laser and Nonlinear Optical Materials (1986), pp. 12–19.
"Barium Borate Optical Parametric Oscillator", Fan et al., IEEE Journal of Quantum Electronics, vol. 25, No. 6, Jun. 1989, pp. 1196–1199.
"Growth and Characterization of Low Temperature Phase Barium Metaborate Crystals", Cheng et al., Journal of Crystal Growth 89 (1988) 553–559.
"Femtosecond Ultraviolet Pulse Generation in $\beta$-BaB$_2$O$_4$", Edelstein et al., Appl. Phys. Lett. 52(26), Jun. 27, 1988, pp. 2211–2213.
"Efficient Deep-Ultraviolet Generation by Frequency Doubling in $\beta$-BaB$_2$O$_4$ Crystals", Miyazaki et al., Optics Letters, vol. 11, No. 12, Dec. 1986, pp. 797–799.
"Measurement of Ultrashort Optical Pulses with —BaB$_2$O$_4$", Cheng et al., Appl. Phys. Lett. 52 (7), Feb. 15, 1988, pp. 519–521.
"Linear Electro-Optic Effect in Barium Metaborate", Nakatani et al., Appl. Phys. Lett 52 (16), Apr. 18, 1988, pp. 1288–1290.
"Visible BaB$_2$O$_4$ Optical Parametric Oscillator Pumped at 355 nm by a Single-Axial-Mode Pulsed Source", Fan et al., Appl. Phys. Lett 53, No. 21, Nov. 21, 1988, pp. 2014–2016.
"Effect of Double Refraction on Type II Phase Matched Second Harmonic Generation", Mehendale et al., Optics Communications, vol. 68, No. 4, Oct. 15, 1988, pp. 301–304.

Primary Examiner—James W. Davie
Attorney, Agent, or Firm—Jones, Tullar & Cooper

[57] ABSTRACT

A walkoff-compensated frequency conversion system such as an optical parametric oscillator includes a pair of nonlinear crystals, such as Beta-Barium Metaborate, aligned in an optical cavity with their optical axes at an angle $\Theta$ with respect to the axis of the cavity. The crystals are oppositely disposed with respect to the cavity axis so that the angle between their respective optical axes is $2\Theta$. In an optical parametric oscillator, the crystals are pumped to produce optical parametric luminescence and frequency conversion, the luminescence being emitted as signal and idler beams. The opposite arrangement of the optical axes of the crystals causes the pumping beam to walk off the signal beam in the first crystal and to walk on the signal beam in the second crystal. Similar walkoff compensation is provided in other frequency conversion systems wherein crystal pairs are oppositely disposed along a cavity optical axis.

17 Claims, 5 Drawing Sheets

OPTICAL WALKOFF COMPENSATION IN CRITICALLY PHASE-MATCHED THREE-WAVE FREQUENCY CONVERSION SYSTEMS

This invention was made with Government support under Grant No. N00014-89-K-2017 awarded by the Naval Research Laboratory and under Grant No. EET-8814647 awarded by the National Science Foundation. The Government has certain rights in the invention.

BACKGROUND OF THE INVENTION

The present invention is directed to walk-off compensation in optical frequency conversion systems such as parametric oscillators, second harmonic generators, sum frequency generators, and difference frequency generators.

The use of various crystals in critically phase-matched, three-wave optical mixers is well known, and is exemplified in known optical second harmonic generators, (SHG), sum frequency generators (SFG), difference frequency generators (DFG), and optical parametric oscillators (OPO). Such systems typically utilize crystals such as $BaB_2O_4$, $LiNbO_3$, $LiIO_3$, $KTiOPO_4$, $LiB_3O_5$, KDP, and others which correspond to optical inputs to provide frequency mixing of the signals. However, it has been found that the conversion efficiency of such mixing systems are often limited by walkoff of optical signals.

The problem of walkoff is illustrated in an optical parametric oscillator utilizing a $BaB_2O_4$ crystal for frequency conversion. The development of broadly tunable, high power, coherent radiation sources based on the optical parametric oscillator (OPO) has accelerated recently due to the availability of excellent new materials, such as low temperature phase barium metaborate (BBO), or $\beta\text{-Ba }B_2O_4$. Such materials are described, for example, by C. Chen, Y. X. Fan, R. C. Eckardt, and R. L. Byer in "Recent Developments in Barium Borate", Proceedings SPIE, Vol 681, pp. 12–19, 1986. The ability of BBO to phase match in the ultraviolet, in addition to having a broad transmission range, a high ultraviolet damage threshold, and a high nonlinearity have established this material as an excellent choice for parametric conversion in the ultraviolet, visible, and near infra-red wavelengths. Optical parametric oscillators pumped at 266 nm, 308 nm, 355 nm, and 532 nm, have been reported to collectively generate continuously tunable radiation from 0.33 micrometers to 3.1 micrometers, with conversion efficiencies ranging from a few percent to 32 percent. Thus, the optical parametric oscillator utilizing BBO has established itself as an excellent source of broadly tunable, pulsed radiation, as described in copending application Ser. No. 07/379,781, to Chen et al, filed Jul. 14, 1989 assigned to the assignee herein.

BBO crystals have a relatively large birefringence which enables phase matching very close to their ultraviolet cutoff at 190 nm. However, in the critically phase matched BBO optical parametric oscillator, this leads to a large walkoff angle between the extraordinary pumping beam and the ordinary signal and idler beams which limits conversion efficiency by reducing the effective interaction length in the crystal. Similar walkoff problems exist in other critically phasematched three-wave conversion systems.

SUMMARY OF THE INVENTION

The present invention is directed to optical conversion systems utilizing nonlinear crystals in such a way as to overcome the difficulties exhibited with prior critically phasematched systems and to provide significantly improved performance in such systems. The invention utilizes one or more pairs of nonlinear optical crystals in a linear cavity, the crystals in each pair being so aligned as to cause each crystal to compensate for the walkoff produced by the other, thereby achieving a substantial improvement in conversion efficiency.

In an example illustrative of the invention, an optical parametric oscillator includes a pair of nonlinear crystals such as BBO are arranged in an oscillator cavity, defined by two end mirrors, the crystals being axially aligned between the two mirrors. Interposed between the crystals and the end mirrors are a pair of pump steering mirrors which direct a pumping beam into the oscillator cavity, through the two BBO crystals, and back out of the cavity, without the pumping wavelength being incident on the end mirrors. The cavity end mirrors are standard, low damage threshold, broadband mirrors, with one being a dielectric high reflector and the other being a 50% output coupler. The two crystals are placed on separate rotation mounts and are set to the phase matching angle corresponding to the desired output wavelengths. The crystals are arranged with their respective optic axes at an angle $\Theta$ (where $\Theta =$ phase matching angle) with respect to the axis of the cavity, and $2\Theta$ with respect to each other.

The laser pumping beam enters the cavity is reflected off a first steering mirror, and passes through the two nonlinear crystals, where frequency conversion takes place to produce signal and idler beam oscillator along the axis of the cavity. The pumping beam then is directed out of the cavity by a second steering mirror in the cavity. The steering mirrors are transparent to signal and idler beams produced in the crystals, so these signals can oscillate along the cavity axis, and an output beam can be obtained through the output coupler end mirror. The conversion efficiency of the crystals in the oscillator depends, on the interaction of the pump and signal beams within the crystals, and it has been found that this efficiency is limited by the angle between the incident pump extraordinary beam and the signal beam. This angle produces walkoff of the incident pump beam with respect to the signal beam, so that interaction between the beams only occurs over a limited length of the nonlinear crystal.

In the configuration of the present invention, the second crystal is located in axial aligment with the cavity but has its optical axis oppositely disposed. This produces an opposite angle between the incident pump beam and the signal beam than the angle produced in the first crystal. As a result, the extraordinary pump beam which walks off the ordinary signal and idler beams of the first crystal then walks on them in the second crystal, thereby increasing the interaction of the beams and increasing conversion efficiency. Tuning of the device is performed by rotating the two crystals about their respective tuning axes in opposite directions to maintain phase matching and to maintain the relationship between the axes of the two crystals.

The conversion efficiency of the device is defined as the ratio of the total output power passing through the cavity end mirrors to the pump power incident on the first pump steering mirror in the cavity. The configuration of the present invention revealed a significant increase in this efficiency.

Similar increases in conversion efficiency are obtained in other critically phasematched, three-wave frequency converters through the use of the walkoff compensation of the present invention, wherein pairs of crystals are oppositely disposed along the axis of a cavity. Examples of such systems are second harmonic generators, wherein an input beam having a fundamental frequency W1 produces a second harmonic frequency beam $\omega_2$; sum frequency generators, wherein two input beams of frequencies $\omega_1$ and $\omega_2$ produce a single frequency output beam $\omega_3$ which is the sum of $\omega_1$ and $\omega_2$; and difference frequency generators, wherein two input beams of frequencies $\omega_1$ and $\omega_2$ produce a single frequency output beam which is the difference between $\omega_1$ and $\omega_2$. In addition, more than one pair of crystals may be used in a cavity; any number of pairs of oppositely disposed crystals may be incorporated in the cavity to improve the conversion efficiency of the system.

Although the following detailed description of the invention is directed primarily to the example of an OPO, it will be understood that the principle of walkoff compensation is not so limited.

In order to narrow the linewidth of the output signal produced by the device, one of the cavity end mirrors may be replaced with a grating having its grooves perpendicular to the polarization of the signal wave. It was found that the addition of such a grating clamps the linewidth at 3 Angstroms, allowing the device to be operated throughout its tuning range with linewidths that do not exceed this value.

BRIEF DESCRIPTION OF THE DRAWINGS

The foregoing, and additional objects, features and advantages of the present invention will become apparent to those of skill in the art from a more detailed consideration of a preferred embodiment thereof, taken in conjunction with the accompanying drawings, in which.

DESCRIPTION OF PREFERRED EMBODIMENT

Figure 1:
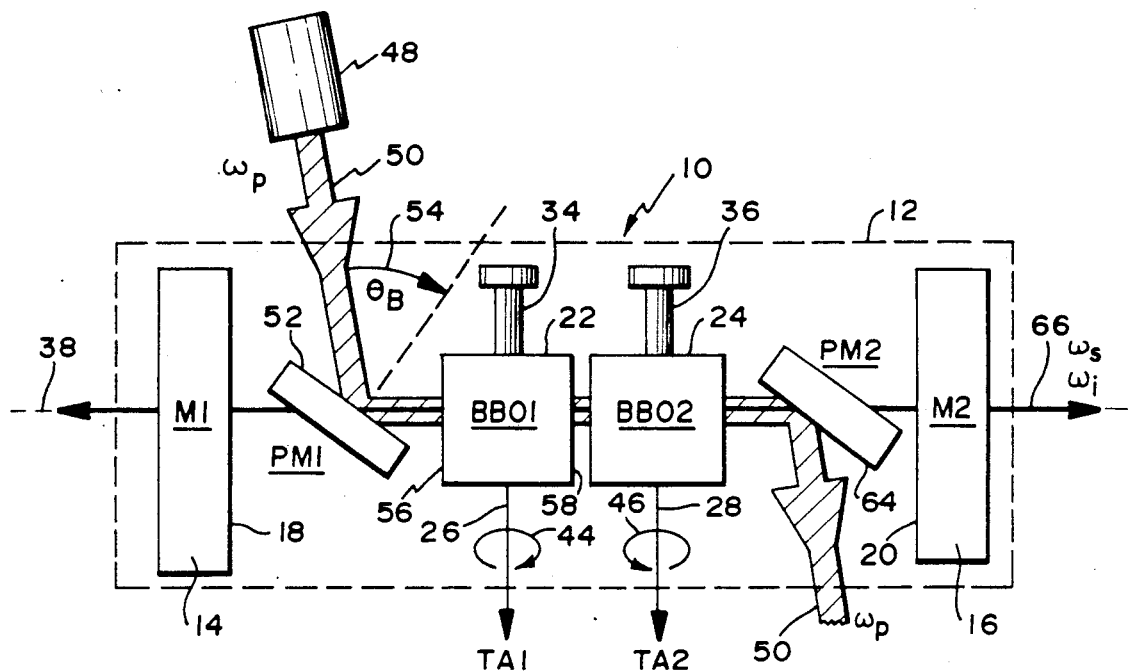
FIG. 1 is a diagrammatic top view of a walkoff-compensated, two-crystal optical parametric oscillator cavity.

Turning now to a more detailed description of one form of the present invention, there is illustrated in FIG. 1 an optical parametric oscillator 10, which includes an optical cavity 12 defined at its opposite ends by a pair of cavity end mirrors 14 and 16 having facing reflective parallel or slightly concave surfaces 18 and 20, respectively, in conventional optical parametric oscillator configuration. The mirrors are mounted with their faces perpendicular to the cavity axis. Mounted in the cavity 12 between mirrors 14 and 16 are a pair of nonlinear optical crystals 22 and 24. The two crystals are mounted for rotation about their respective crystallographic X axes 26 and 28 to provide tunability for the oscillator. Except for the additional nonlinear crystal, the cavity arrangement for oscillator 10 is the same as that described in detail in U.S. patent application Ser. No. 07/455,179, filed Dec. 22, 1989 of Bosenberg et al, the disclosure of which is incorporated herein by reference.

Figure 2:
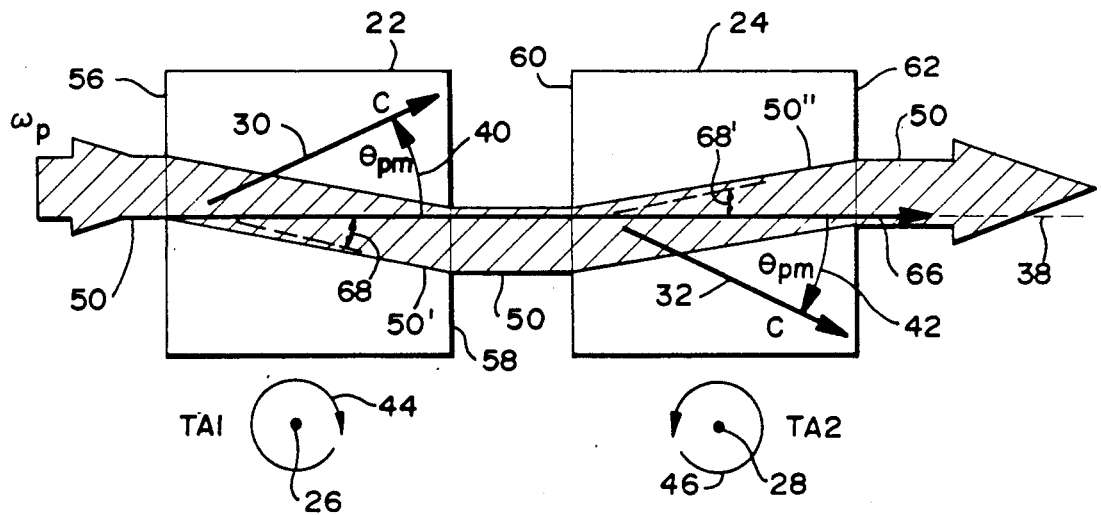
FIG. 2 is a diagrammatic, enlarged side view of the crystals of the cavity of FIG. 1.

In a preferred form of the invention, the crystals 22 and 24 are a low temperature phase beta barium metaborate (BBO). The two BBO crystals used in a test of the present invention were grown using the top seeded solution growth technique described by L. K. Chen, W. R. Bosenberg, and C. L. Tang in the *Journal of Crystal Growth*, Vol. 89, p. 553, 1988. The first crystal 22 is provided with an aperture of $10 \times 10$ mm$^2$ with an interaction length of 11.5 mm and is cut for type I phasematching with an angle of 30.2° between the entrance face normal and the optic axis of the crystal. This optic axis is illustrated in FIG. 2 by the arrow 30 for crystal 22. Crystal 24 is a $10 \times 10$ mm$^2$ crystal with an interaction length of 9.5 mm and is cut for type I phase matching with an angle of 29.3° between the entrance face normal and its optic axis 32 (FIG. 2). The crystals 22 and 24 are placed on separate rotation mounts, diagrammatically illustrated at 34 and 36 so that they are rotatable about axes 26 and 28, respectively, which are perpendicular to the axis of cavity 12. This latter axis is illustrated by line 38 in FIGS. 1 and 2. The two crystals are rotatably adjusted so that their optical axes 30 and 32 are oppositely disposed with respect to cavity axis 38, and are both set to the phasematching angle $\Theta_{pm}$ with respect to axis 38, which angle corresponds to the desired output wavelength. This angle is illustrated at 40 in FIG. 2 for crystal 22 and at 42 for crystal 24, and is on opposite sides of the cavity axis 38 for the two crystals so that the crystals are arranged with their respective optic axes at an angle of 2 $\Theta_{pm}$ relative to one another. Tuning of the device is easily performed by rotating the two crystals 22 and 24 about their tuning axes 26 and 28 in opposite directions, as indicated by arrows 44 and 46 to maintain phase matching.

The oscillator 10 is pumped by a source 48, which preferably is a commercially available Q-switched neodymium-doped yttrium aluminum garnet (Nd:YAG) laser. The pumping source produces an output pumping signal $W_p$ indicated by pump beam 50. The pumping pulses in beam 50 may be, for example, the third harmonic of the laser output, and the beam may have a diameter of 1.0 mm, with the pulses having a pulse duration of 7 ns. The pump beam 50 is directed into the oscillator cavity 12 to a first pump steering mirror 52 set at Brewster's angle $\Theta_B$, indicated by angle 54 in FIG. 1, with respect to the direction of the pump beam. The mirror 52 is located in cavity 12 and is also set at Brewster's angle with respect to the cavity axis 38 so that the pump beam 50 is directed along axis 38 from mirror 52 to impinge on the first crystal 22. The first steering mirror 52 is a standard, commercially available 45° incidence mirror, with its reflective surface being greater than 98% reflective at the pumping wavelength of 355 nm. In addition, the surface of mirror 52 is transmissive at the parametrically generated oscillator output beam wavelength of interest. Typically, such a mirror may be transmissive at wavelengths up to about 2.2 micrometers, where the absorption of infrared by the fused silica substrate for the mirror cuts off the transmissivity.

The pump beam 50 is directed by mirror 52 along axis 38 to a first end 56 of the first crystal 22, passes through the crystal and exits from its second end 58, as illustrated in FIG. 2. The pump beam 50 then enters the first end 60 of the second crystal 24, passes through that crystal and exits from its second end 62. The pump beam exiting from end 62 of crystal 24 then strikes a second pump steering mirror 64 which is similar to mirror 52, with its surface also set at Brewster's angle with respect to the axis 38. The surface of mirror 64 is highly reflective at the pumping pulse wavelength so that it deflects beam 50 out of cavity 12, as illustrated in FIG. 1. The mirror 64 is transmissive at the parametrically generated wavelength of interest.

The cavity end mirror 14 is a standard, low damage threshold, broad band, dielectric high reflector having a reflectivity of over 90% at wavelengths of between 480 and 700 nm. Cavity end mirror 16 is a 50% output coupler. All of the mirrors 14, 16, 52 and 64 transmit over 90% of the infrared idler waves which are at frequency $\omega_i$, thereby insuring singly resonated operation. The cavity length, in one embodiment of the OPO of this invention, was 55 nm between the surfaces 18 and 20 of mirrors 14 and 16, allowing about 17 round trips of the resonated wave.

As set out in Ser. No. 07/455,179, the pumping beam 50 produces optical parametric luminescence and frequency conversion in crystal 22 at wavelengths which depend upon the rotational angle of the crystal about its axis 26, and thus depend upon angle $\Theta_{pm}$. This luminescence is emitted from the end 58 of the crystal along the cavity axis 38 as signal and idler beams $\omega_s$ and $\omega_i$. These beams are transmitted into the second crystal 24 along with the pumping beam 50 to produce further optical parametric luminescence and frequency conversion in that crystal, again at wavelengths which depend upon the rotational angle of crystal 24 about its axis 28. The two crystals are adjusted so that the signal and idler beams produced by crystal 22 are phase matched with those produced by crystal 24 so that desired parametric oscillation is produced in the cavity 12.

The K vector wavefront of the pump beam 50 and of the signal beam produced in the crystal 22 by the pumping action of beam 50 moves straight through the crystal 22 and the crystal 24, as indicated by the signal and idler beam path 66. However, the extraordinary energy wave and the ordinary energy wave of a laser respond differently to the index of refraction of the medium in which they travel, and thus do not travel in parallel through a nonlinear birefringent crystal, with the angle between the energy waves being related to the amount of birefringence. In a material such as BBO, this is a relatively large angle. The pump beam $\omega_p$ is an extraordinary wave, while the signal and idler waves $\omega_s$ and $\omega_i$ on path 66 in the crystal 22 and in the crystal 24 are ordinary waves. The pump waves must interact with the signal and idler waves in the crystal in order to produce frequency conversion and the more interaction, the better the conversion. The required interaction is produced by critical phase matching of the pump with the signal beams which is achieved by adjusting the angle $\Theta_{pm}$ of the extraordinary wave of the pump with respect to the optical axis of the crystal indicated by 30 for crystal 22 and by 32 for crystal 24.

The direction in which the extraordinary wave energy travels through the crystal (the Poynting vector) is, however, different than the direction of the ordinary wave, as illustrated in FIG. 2 by angle 68, with the result that the extraordinary wave walks off the crystal; i.e., moves transversely with respect to the optical axis and in a direction away from that axis, as indicated in FIG. 2 by the pump wave at 50'. Although the pump beam enters the crystal 22 in a direction normal to face 56, the extraordinary energy wave moves at an angle 68 with respect to the direction of the ordinary signal and idler waves, due to the change in the index of refraction as the pum beam 50 enters the crystal. In a BBO crystal, this walkoff angle 68 can be 3° to 5°, thus limiting the interaction between the pump and the signal waves as the pump wave passes through the crystal. This effectively limits the length of the crystal and reduces its conversion efficiency.

In accordance with the present invention, this limitation is overcome by the provision of the second crystal 24 which is mounted in the path of the pump beam 50 and is aligned with the signal beam $\omega_s$ from crystal 22. However, in accordance with the invention, the second crystal 24 has its optical axis 32 disposed oppositely, with respect to cavity axis 38, than the axis of crystal 22. Thus, angles 40 and 42 of the two crystals 22 and 24, respectively, are on opposite sides of the axis 38 with the angle between optical axes 30 and 32 being the sum of the angles 40 and 42. This opposite disposition of the two crystals produces walkoff in crystal 24 at the same angle 68' with respect to axis 38 as is produced in crystal 22, but in a direction with respect to the cavity axis which is opposite to . that produced by crystal 22, as indicated at 50". This causes the walkoff produced by crystal 24 to bring the pump beam back toward axis 38, i.e., it causes the beam to "walk on", thereby compensating for the walkoff produced by crystal 22. This compensation effectively doubles the interaction distance in the optical parametric oscillator cavity and increases its conversion efficiency from about 24% for a single crystal to about 32% for two crystals.

Figure 4:
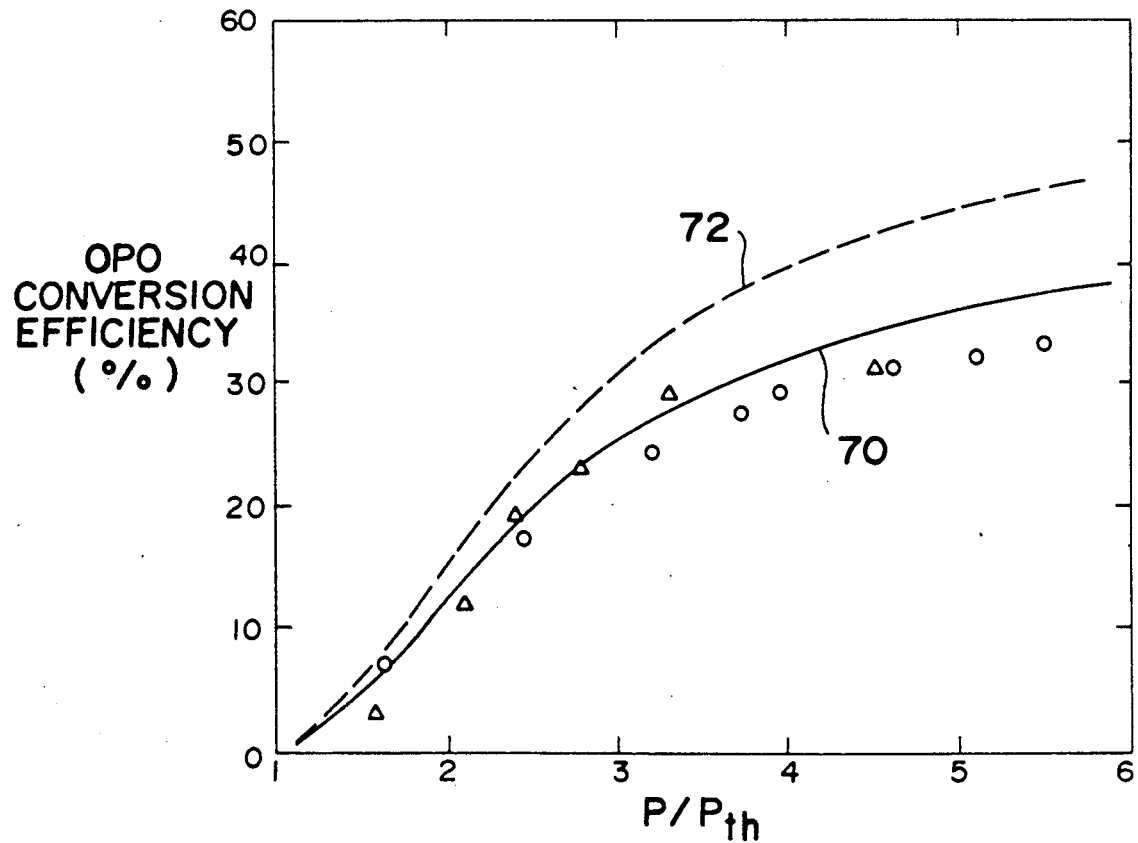
FIG. 4 is a graphical illustration of optical parametric oscillator conversion efficiency versus pumping.

The conversion efficiency n of the device was determined by measuring the ratio of the total oscillator output power passing through exit mirrors 14 and 16 to the pump power (P) incident on the steering mirror 52 from source 48. The efficiency of the device so determined provides the total usable power converted from the pump inlet to the signal and idler wavelengths. The oscillation threshold power ($P_{th}$) for the device was measured by reducing the pump power until only occasional oscillator flashes were observed. FIG. 4 is a graph which illustrates the total usable optical parametric oscillator (OPO) conversion efficiency versus the pumping power as a ratio of threshold power for the oscillator 10. In a test of the invention, signal and idler wavelengths of 505 nm and 1.2 micrometers, respectively, were obtained. The data was obtained by a high quality, central-Airy-disc using a 1 mm diameter pump beam, the data points of which are indicated by triangles. Data was also obtained with a larger 1.5 mm beam of somewhat poorer spatial quality, the data points of which are indicated in the Figure by circles. Both sets of data saturate at about 32% efficiency. The oscillation threshold is 1.7 mJ per pulse (27 MW per cm$^2$) for the 1 mm beam and 5.0 mJ per pulse (about 37 MW per cm$^2$) for the 1.5 mm beam. With the larger beam, as much as 7 mJ per pulse of OPO output was observed (with 21 mJ per pulse of pump).

The solid line 70 in FIG. 4 is the theoretical conversion efficiency for a singly resonant oscillator obtained by integrating plane wave solutions over a Gaussian intensity profile, with two modifications. First, for pulsed OPO operation, a temporal integral must be performed, yielding a factor of about $(1-P_{th}/P)$. Second, a scale factor must be used to account for reflection losses of the uncoated crystals and the intracavity pump steering mirrors. For the cavity used in the test, this factor was estimated to be about 0.65, so roughly one-third of the parametrically generated light was lost to intracavity reflections, which implies that the peak internal conversion efficiency of the device is about 50%. The agreement between the theoretical curve and the experimental data was quite good for both pump beams, the poorer spatial quality of the larger beam manifesting itself in the form of a higher threshold intensity.

The dashed curve 72 in FIG. 4 represents an estimate of the usable conversion efficiency of a device with the lower intracavity losses obtained by using anti-reflection coated BBO crystals. With careful optimization of intracavity coatings, about 50% of the input pump could be converted into useful output. Although the efficiency data is for a particular signal and idler pair, angle tuning of the device is very straightforward. A single set of mirrors and a single pair of crystals allows continuous tuning over the range of 0.42 to 2.3 micrometers, with better than 24% conversion efficiency throughout. At idler wavelengths longer than 2.4 micrometers, the loss due to the onset of absorption in the BBO crystals and the fused silica pump mirror substrates increases the oscillation threshold and limits the efficiency.

To verify that the two-crystal design is key to the improved conversion efficiency, the two-crystal, walkoff-compensated oscillator 10 of FIG. 1 was directly compared to two other configurations using identical crystals and mirrors under identical pump conditions. A conventional one-crystal design and a two-crystal design with the two optic axes parallel were tested. Table I gives a summary of these results.

TABLE I

| Crystal Configuration | 1.0 mm diameter Beam | | 1.5 mm Diameter Beam | |
|---|---|---|---|---|
| | Threshold (mJ/Pulse) | Maximum Efficiency (%) | Threshold (mJ/Pulse) | Maximum Efficiency (%) |
| Two crystals Opposing Optic Axes Walkoff-compensated | 2.1 | 32 | 5.0 | 33 |
| Two crystals Parallel Optic axes Not Walkoff-compensated | 4.1 | 20 | 6.0 | 22 |
| One crystal | 3.5 | 21 | 9.5 | 18 |

The walkoff-compensated scheme of FIG. 1 clearly demonstrates lower thresholds and higher maximum efficiencies. The value of the saturated maximum efficiency in the one crystal oscillator agrees well with previously reported results. The results illustrated in Table I suggest that for the BBO oscillator, the walkoff-compensated, two-crystal design of the present invention is more efficient than the one-crystal design, independent of the quality of the pump source.

Figure 3:
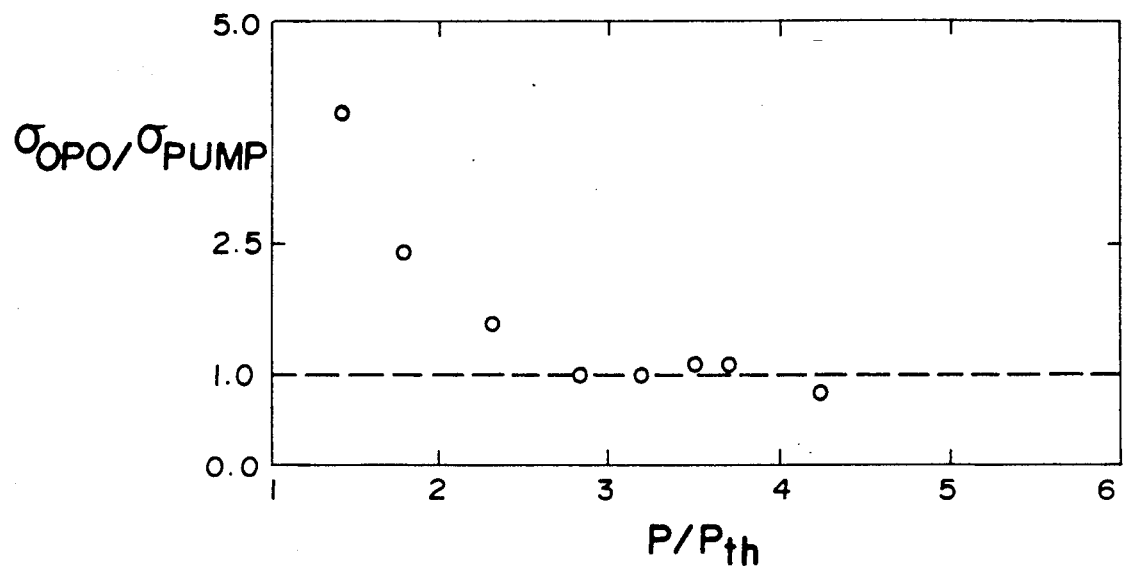
FIG. 3 is a graphical illustration of the ratio of the standard deviation of the fluctuation of optical parametric oscillator pulse energies to the fluctuation of the pump pulse energies, versus pumping, the dashed line denoting the point where the fluctuation of the oscillator output is equal to that of the pump.

The pulse-to-pulse fluctuation of the oscillator output was determined using a fast photodiode (rise time less than 200 ps) to measure the energies of individual pulses. The variation of the OPO pulse energies was compared to that of the pump pulse energies. These results are shown in FIG. 3. In the saturated regime (n greater than 25%), the standard deviation of OPO pulse energies (about 6% of the mean pulse energy) is about equal to that of the pump pulse energies (about 7%) while in unsaturated operation (n less than 25%) the OPO fluctuations are considerably larger than those of the pump with standard deviation as high as 25% of the mean. Thus, operation of this device in the saturated regime is essential to achieving maximum pulse-to-pulse stability.

For many applications, the linewidth of the output of oscillator 10 is an important parameter. The linewidth of the two-crystal OPO output was measured with a 0.5 m monochromator whose wavelength resolution was approximately 0.3 Angstroms. The dashed line 74 in FIG. 5, calculated using published Sellmeier coefficients, is in good agreement with experimental data indicated by triangles that show the dramatic increase in the OPO linewidth as the device is tuned toward the degenerate point typical of all type I OPOs. The linewidth measurements are full-width-half-maximum values, and the observed linewidths vary from 1.5 Angstroms far from degeneracy to over 100 Angstroms at degeneracy. Clearly, for applications requiring narrow linewidth sources, external linewidth control is needed.

The required control can be obtained by replacing, for example, the cavity mirror 14 (FIG. 1) with a grating. For example, a Milton-Roy Number 35-53-290 grating has 1800 grooves per millimeter, and a blaze angle of 26.7°. Such a grating was placed with its grooves perpendicular to the polarization of the signal wave 66 for improved broadband diffraction efficiency.

The results of three experimental grating schemes are shown in Table II:

TABLE II

| Grating Configuration | OPO Signal Linewidth (Angstroms) | Threshold (mJ/pulse) | Maximum Efficiency (%) |
|---|---|---|---|
| No grating | 1.5-100 | 2.0 | 33 |
| Littrow (first order) | 1.5-3.0 | 3.0 | 25 |
| Littrow (second order) | 1.2-2.5 | 4.0 | 18 |
| Littman | 0.3 | 5.5 | 9 |

Figure 5:
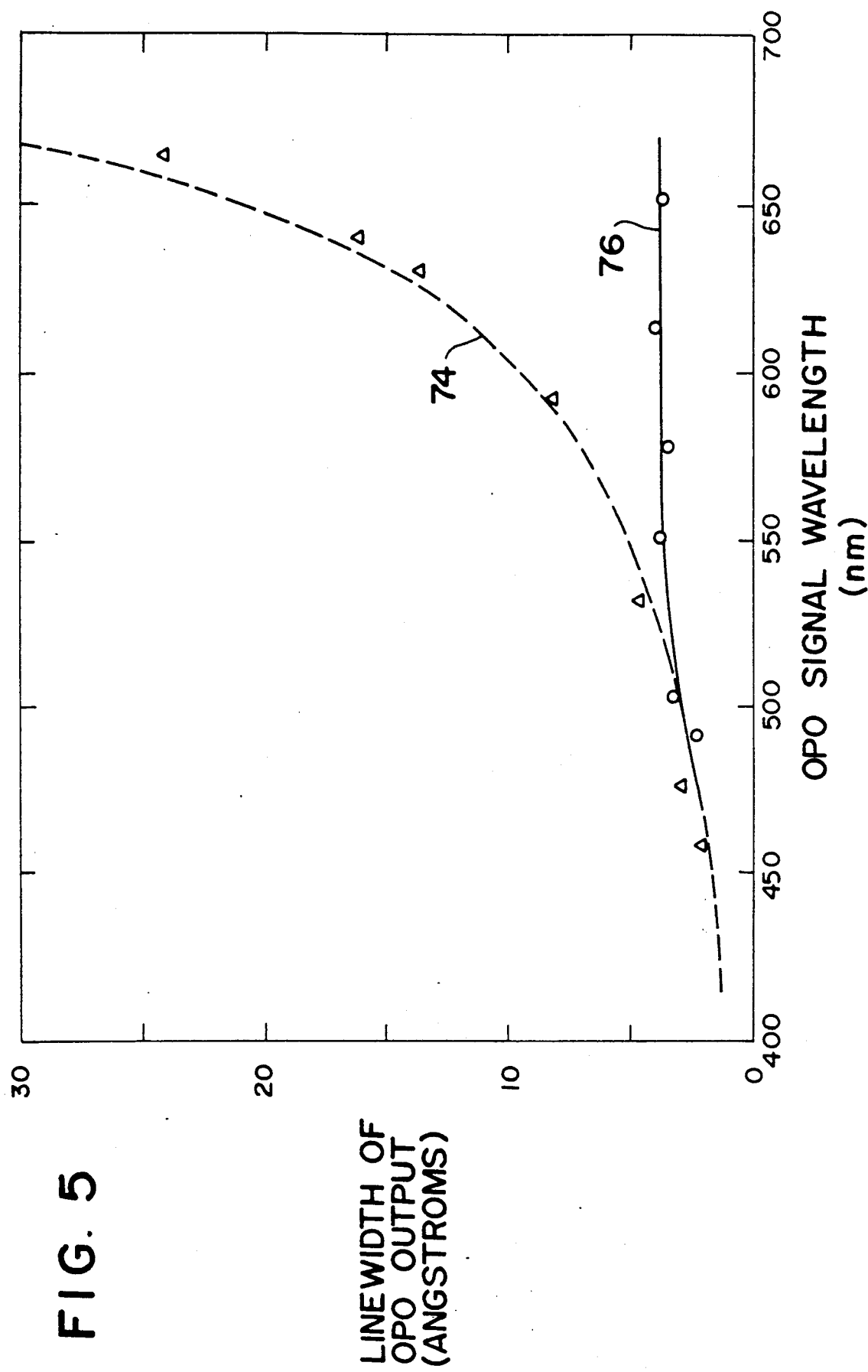
FIG. 5 is a graphical illustration of optical parametric oscillator linewidth versus signal wavelength.

The most efficient cavity involves placing the grating in the first order Littrow configuration. The solid line 76 drawn through the data in FIG. 5 shows that for signal wavelengths whose unnarrowed gain bandwidth is less than 3 Angstroms (wavelength less than 500 nm), the OPO gain controls the linewidth, while for signal wavelengths whose gain bandwidth is greater than 3 Angstroms (wavelength greater than 500 nm), the grating clamps the linewidth at 3 Angstroms. Due to the excellent grating efficiency in the Littrow configuration, the line-narrowed OPO conversion efficiency is as high as 25%. Hence, the device can be operated throughout its tuning range with linewidths of 1.5 to 3.0 Angstroms without sacrificing significant amounts of output power.

The second order Littrow configuration yields linewidths only slightly narrower than the first order configuration, but with a noticeable increase in oscillator threshold due to the decreasing grating efficiency. Finally, using the grating in a grazing-incidence, or Littman, configuration (angle of incidence about 87°) and using a high reflecting aluminized mirror as the cavity mirror, linewidths of 0.3 Angstroms were measured with a scanning Fabry-Perot Etalon. Due to the poor efficiency of the grating at grazing incidence (about 6% per pass) the oscillator threshold is nearly double that of the first order Littrow scheme and hence the conversion efficiency of the OPO is significantly lower. The improvement in linewidth, however, makes the Littman design a good option for lower power, high-resolution applications. Thus, a single grating can be used to achieve narrow line-widths in a BBO optical parametric oscillator.

Figure 6:
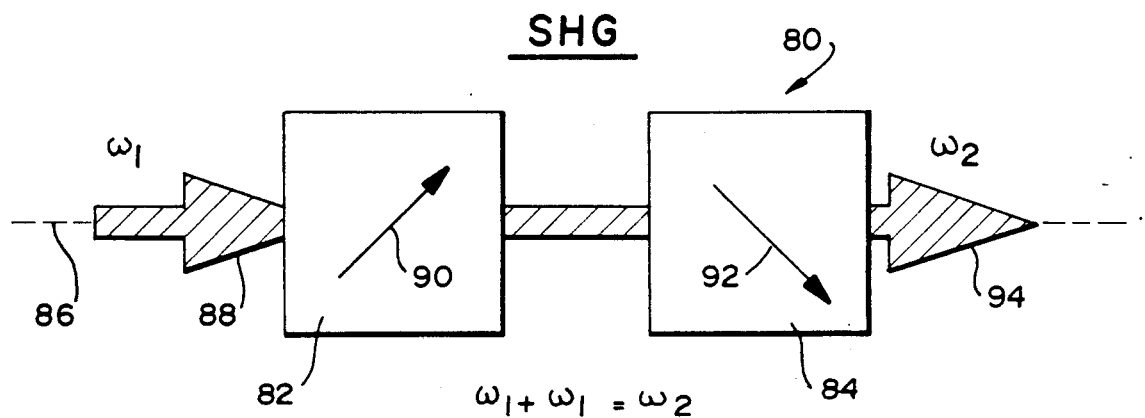
FIG. 6 is a diagrammatic illustration of a walkoff-compensated second harmonic generator in accordance with the present invention.

FIG. 6 illustrates in diagrammatic form a walkoff compensated second harmonic generator (SHG) 80, wherein a pair of non-linear crystals 82 and 84 such as BBO are arranged along an axis 86 defined by a pump beam 88. The crystals are aligned with the axis 86 in the manner described above for crystals 22 and 24, with each crystal being mounted with its optical axis (90, 92, respectively) at a phasematching angle with respect to the direction of travel of the generated signal beams, i.e., with respect to axis 86. The input beam $\omega_1$ which impinges on the first crystal 82 is phasematched with the signal beam $\omega_2$ produced by the crystals, so that the output signal beam 94 is the second harmonic of the input beam. The input beam walks off the signal beam in crystal 82, as explained above with respect to FIG. 1, but the second crystal 84 has its optical axis 92 oppositely disposed with respect to the optical axis 90 of crystal 82. This causes the input beam to walk on the signal beam in crystal 84, thereby extending the interaction between the beams within the crystals and increasing the conversion efficiency of the system.

Figure 7:
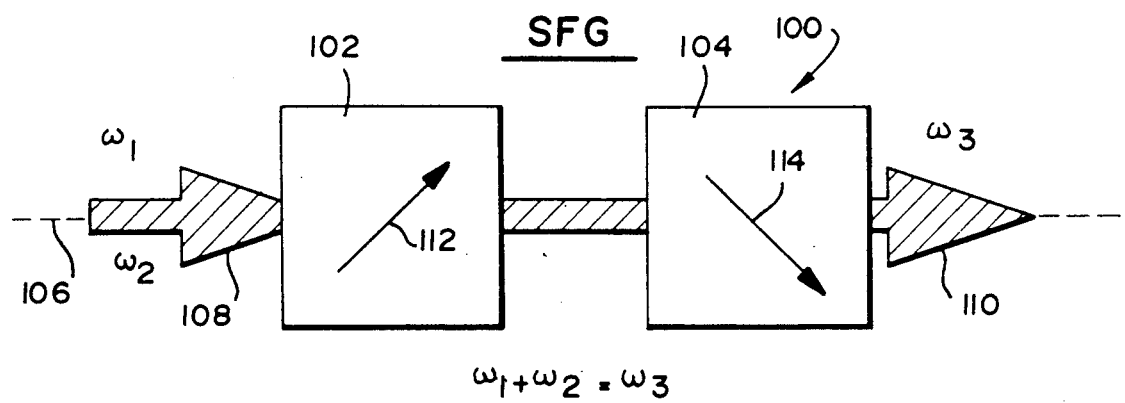
FIG. 7 is a diagrammatic illustration of a walkoff-compensated sum frequency generator in accordance with the present invention.

Another critically phasematched three wave configuration for a walkoff compensated system is generally illustrated at 100 in FIG. 7. System 100 includes a pair of crystals 102 and 104 oppositely disposed with respect to a common axis 106. This system is a sum frequency generator (SFG), wherein two input pump beams at frequencies $\omega_1$ and $\omega_2$, indicated at 108, are combined in crystals 102 and 104 to generate a single frequency output $\omega_3$ at 110 which is the sum of frequencies $\omega_1$ and $\omega_2$. The crystals 102 and 104 have their respective optical axes 112 and 114 on opposite sides of the axis 106 so that the input beams $\omega_1$ and $\omega_2$ walk off crystal 102 and walk on crystal 104, in the manner discussed above with respect to FIG. 1.

Figure 8:
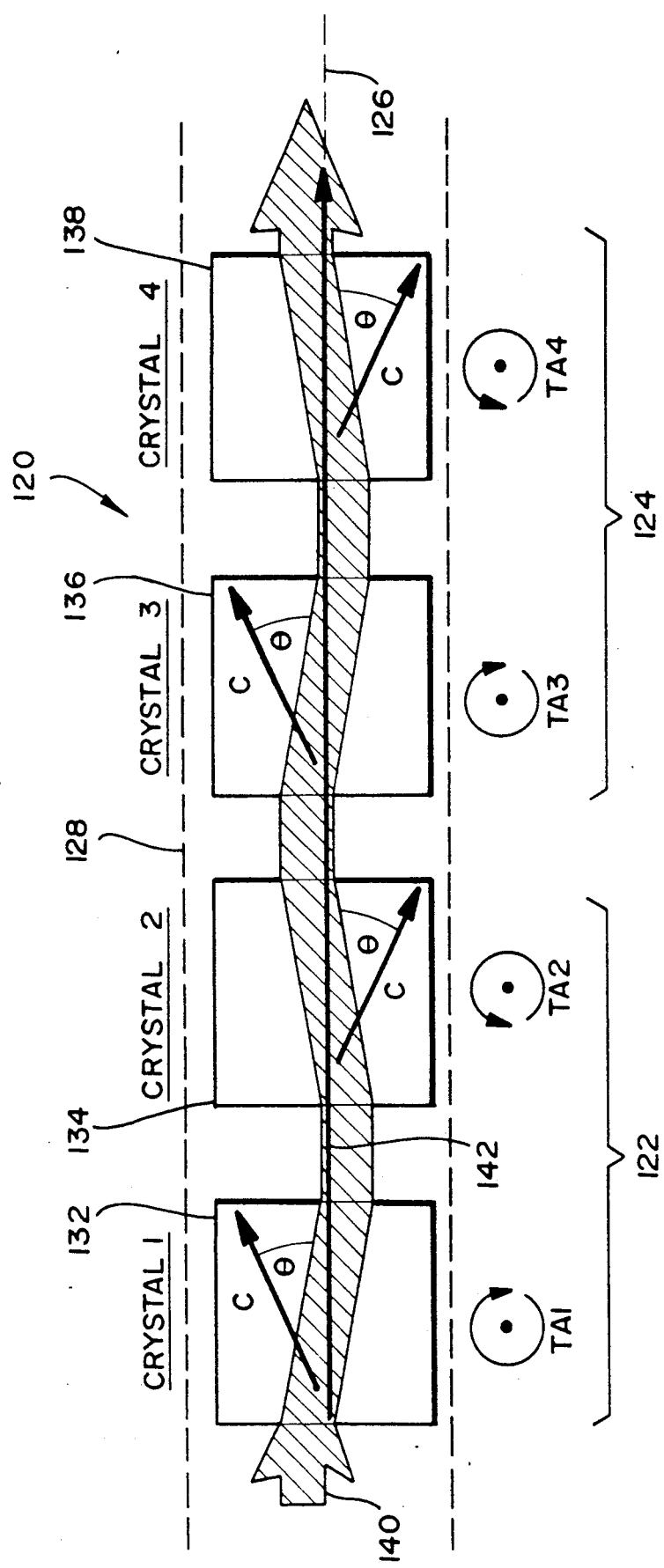
FIG. 8 is a diagrammatic illustration of a walkoff-compensated scheme utilizing multiple crystal pairs.

Although a single pair of crystals provides walkoff compensation in the manner discussed above, it may be desired to further improve the performance of a frequency conversion system by utilizing plural pairs of crystals, as indicated in the frequency conversion system 120 of FIG. 8. As there illustrated, two pairs 122 and 124 of crystals are aligned along the axis 126 of a cavity 128, between cavity end mirrors (not shown). Crystals 132 and 134 make up the first pair 122, and crystals 136 and 138 make up the second pair 124. In each pair, the crystals have their optical axes oppositely disposed with respect to the cavity axis, in the manner described with respect to FIG. 1. In the illustrated form of FIG. 8, an extraordinary wave 140 walks off crystal 132, and walks on crystal 134, with respect to the axial signal wave 142. The wave 140 travels to the second pair of crystals where it walks off the signal wave in crystal 136 and walks on it in crystal 138, again in the manner described with respect to FIG. 1. As a result, the extraordinary wave and the signal wave interact for a greater distance in the nonlinear crystals to improve the efficiency of the frequency conversion systems.

Although the preferred crystals for optical parametric oscillators are BBO crystals, it will be understood that the technique for walkoff compensation disclosed herein is applicable to critically phasematched frequency conversion systems using other nonlinear crystals, as noted above.

Thus, there has been demonstrated a new, two-crystal, walkoff-compensated optical frequency conversion laser system which provides significantly improved conversion efficiency. In addition, linewidth narrowing can be obtained with this two-crystal design using simple grating schemes. For example, a high performance 355 nm pumped BBO oscillator can be built entirely from standard, commercially available parts and is well adapted for applications requiring a high power, broadly tunable, narrow linewidth source of visible and near infrared radiation. Although the present invention has been described in terms of preferred embodiments thereof, it will be apparent that variations and modifications may be made without departing from the true spirit and scope thereof as set forth in the following claims.

What is claimed is:

1. A walkoff compensated optical frequency conversion system comprising:
   first and second nonlinear optical crystals each having a corresponding optical axis;
   first and second mounting means mounting said first and second crystals, respectively, in alignment with each other along a common axis, each said crystal being mounted with its respective optical axis at an angle $\Theta$ with respect to said common axis, said crystals being oppositely disposed with respect to said common axis to provide an angle $2\Theta$ between the optical axes of the first and second crystals; and
   means directing a beam of light along said common axis and through said first and second crystals.

2. The system of claim 1, further including means directing a first beam having a fundamental frequency $\omega_1$ into and through said first and second crystals in sequence to generate a signal beam along said common axis, said fundamental frequency being converted to a signal beam of frequency $\omega_2$ along said common axis, said first beam walking off said signal beam in said first crystal and walking on said signal beam in said second crystal.

3. The system of claim 2, wherein said first and second crystals are rotatable in opposite directions with respect to said common axis to tune said signal beam frequency $\omega_2$.

4. The system of claim 1, further including means directing first and second beams having frequencies $\omega_1$ and $\omega_2$ into and through said first and second crystals in sequence to generate a signal beam on said common axis, said signal beam having a frequency $\omega_3$ which is the sum of the frequencies $\omega_1$ and $\omega_2$.

5. A walkoff compensated optical parametric oscillator, comprising:
   a linear optical cavity having a longitudinal axis;

first and second nonlinear optical crystals each having a corresponding optical axis;

first and second means mounting said first and second crystals, respectively, in said cavity and along the axis thereof, each of said crystals being mounted with its respective optical axis at an angle Θ with respect to the longitudinal axis of said cavity, said crystals further being mounted to have an angle 2Θ between the axes thereof;

first and second pump steering mirrors located in said cavity on opposite sides of said crystals for receiving a pumping beam entering said cavity, directing said pumping beam through said first and second crystals in sequence to stimulate oscillation therein, and thereafter directing said pumping beam out of said cavity, said first and second crystals being so angled with respect to said cavity axis that said pumping beam walks off said first crystal and walks on s id second crystal.

6. The compensated oscillator of claim 5, wherein said mounting means for each said crystal is rotatable to tune the stimulated oscillation in said oscillator.

7. The compensated oscillator of claim 5, wherein each said mounting means is rotatable to adjust the optical axis of its corresponding crystal with respect to said cavity axis, whereby said oscillator is tuned.

8. The compensated oscillator of claim 7, wherein said mounting means are rotatable to adjust the optical angle of each of said crystals with respect to the axis of said cavity to selectively stimulate oscillation having a desired output wavelength.

9. The compensated oscillator of claim 8, wherein said optical cavity is defined at its opposite ends by a pair of reflective cavity end mirrors, at least one of which is partially transmissive to oscillation at said desired wavelength.

10. The compensated oscillator of claim 9, wherein each said crystal is a Beta barium metaborate crystal.

11. A walkoff compensated optical parametric oscillator, comprising:

a linear optical cavity including first and second spaced cavity end mirrors aligned along a longitudinal cavity axis;

first and second spaced steering mirrors within said cavity between said first and second mirrors and aligned with said axis, first and second nonlinear optical crystals within said cavity between said first and second mirrors and aligned with said axis, said crystals having substantially identical characteristics and each having an optical axis at an angle Θ with respect to said cavity axis, the optical axes of said first and second crystals being separated from each other by an angle 2Θ;

means directing a pumping beam into said cavity to impinge on said first steering mirror, said first mirror directing said pumping beam through said first crystal to produce optical parametric luminescence and frequency conversion in said first crystal at wavelengths which depend upon the angle Θ the luminescence of said first crystal being emitted therefrom as signal and idler waves along said cavity axis, said pumping beam being transmitted through said first crystal to said second crystal to produce optical parametric luminescence and frequency conversion in said second crystal, the luminescence of said second crystal being emitted therefrom as signal and idler waves along said cavity axis, said pumping beam being transmitted through said second crystal to said second steering mirror which directs said pumping beam out of said cavity, the parametric luminescence of said first and second crystals passing through said first and second steering mirrors and being at least partially reflected by said cavity end mirrors to produce oscillation in said cavity, said first and second crystals being so aligned that said pumping beam walks off said first crystal to thereby improve the interaction between the pumping beam and the signal waves in said crystals.

12. The compensated oscillator of claim 11, wherein each of said first and second crystals is a β Barium Borate crystal.

13. The compensated oscillator of claim 12, further including rotatable mounting means for each said crystal, whereby each crystal is rotatable about an axis of rotation perpendicular to said cavity axis to selectively vary the angle between its optical axis and said cavity axis.

14. The compensated oscillator of claim 13, wherein rotatable said rotatable mounting means for each said crystal rotatable to vary the angles of said optical axes with respect to said cavity axis in opposite directions.

15. The compensated oscillator of claim 13, wherein said rotatable mounting means is adjustable to vary the angles of said crystal optical axes to adjust the phase matching of said pumping beam and said crystal signal waves to select the wavelength of said signal waves.

16. The compensated oscillator of claim 15, wherein at least one of said cavity end mirrors is a grating to provide narrow linewidth signal waves from said oscillator.

17. The compensated oscillator of claim 16, wherein said signal waves are polarized, and wherein said grating has grooves perpendicular to the polarization of said signal waves.

* * * * *